US008171731B2

(12) United States Patent
Joergl et al.

(10) Patent No.: US 8,171,731 B2
(45) Date of Patent: May 8, 2012

(54) ENGINE AIR MANAGEMENT SYSTEM

(75) Inventors: Volker Joergl, Breitenfurt (AT); Timm Kiener, Lake Orion, MI (US); Olaf Weber, Bloomfield Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 767 days.

(21) Appl. No.: 11/920,283

(22) PCT Filed: May 11, 2006

(86) PCT No.: PCT/US2006/018418
§ 371 (c)(1),
(2), (4) Date: Jan. 28, 2009

(87) PCT Pub. No.: WO2006/122306
PCT Pub. Date: Nov. 16, 2006

(65) Prior Publication Data
US 2009/0223219 A1 Sep. 10, 2009

Related U.S. Application Data

(60) Provisional application No. 60/679,810, filed on May 11, 2005.

(51) Int. Cl.
F02B 33/44 (2006.01)
(52) U.S. Cl. ...................................................... 60/605.2
(58) Field of Classification Search .................. 60/605.2
See application file for complete search history.

(56) References Cited

U.S. PATENT DOCUMENTS

| 6,263,672 B1 * | 7/2001 | Roby et al. .................. 60/605.2 |
| 6,301,888 B1 | 10/2001 | Gray, Jr. |
| 6,430,929 B2 * | 8/2002 | Martin ........................ 60/605.2 |
| 6,920,755 B2 * | 7/2005 | Hoecker et al. ................. 60/612 |
| 6,973,787 B2 * | 12/2005 | Klingel ............................ 60/612 |
| 6,988,365 B2 * | 1/2006 | Sasaki .......................... 60/605.2 |
| 7,043,914 B2 * | 5/2006 | Ishikawa ...................... 60/605.2 |
| 7,168,250 B2 * | 1/2007 | Wei et al. ..................... 60/605.2 |
| 7,195,006 B2 * | 3/2007 | Khair et al. ............. 123/568.12 |

(Continued)

FOREIGN PATENT DOCUMENTS

EP 1394380 A1 * 3/2004

(Continued)

Primary Examiner — Quyen Leung
Assistant Examiner — Thomas Truong
(74) Attorney, Agent, or Firm — Warn Partners, P.C.

(57) ABSTRACT

An air management assembly (10) for use in an engine (12) with an exhaust manifold (14) that outputs an exhaust gas and an intake manifold (16), with a filter (18) in fluid communication between the exhaust manifold (14) and turbocharger (20). The air management assembly (10) provides a compressor (22), a turbine (24), at least one gaseous fluid cooler (32, 36, 44), at least one bypass (28, 28)' and a housing (30) where the compressor (22), turbine (24), at least one gaseous fluid cooler (32), (36, 44), bypass (28, 28'), or combination thereof are integrated into the housing (30). The compressor (22) is in fluid communication with the intake manifold (16). The turbine (24) is in fluid communication with the exhaust manifold (14). The turbine (24) and the compressor (22) are moveably coupled and move in conjunction with one another. The gaseous fluid coolers (32, 36, 44) are in fluid communication with the compressor (32), turbine (24), or combination thereof. The bypass (28') is in fluid communication with an output of the turbine (24) and an input of the compressor (22) for selective bypassing of the gaseous fluid cooler (44).

37 Claims, 4 Drawing Sheets

U.S. PATENT DOCUMENTS

| | | | |
|---|---|---|---|
| 7,219,661 B2 * | 5/2007 | Aberle | 123/568.12 |
| 7,281,378 B2 * | 10/2007 | Gu et al. | 60/599 |
| 2003/0172913 A1 * | 9/2003 | Hummel et al. | 123/559.1 |
| 2004/0050375 A1 | 3/2004 | Arnold | |
| 2004/0255582 A1 * | 12/2004 | Sumser et al. | 60/605.1 |
| 2007/0068500 A1 * | 3/2007 | Joergl et al. | 123/568.24 |
| 2007/0125081 A1 * | 6/2007 | Czarnowski et al. | 60/599 |
| 2009/0013978 A1 * | 1/2009 | Joergl et al. | 123/568.12 |

FOREIGN PATENT DOCUMENTS

| | | | |
|---|---|---|---|
| GB | 2406138 | | 3/2005 |
| JP | 09209848 A | * | 8/1997 |
| WO | WO 99/31375 | | 6/1999 |
| WO | WO 2005017329 A1 | * | 2/2005 |

* cited by examiner

ENGINE AIR MANAGEMENT SYSTEM

CROSS-REFERENCE TO RELATED APPLICATIONS

This application is a National Stage of International Application No. PCT/US2006/018418, filed May 11, 2006. This application claims priority to U.S. Patent Application No. 60/679,810 filed on May 11, 2005. The disclosures of the above applications are incorporated herein by reference.

FIELD OF THE INVENTION

The present invention relates to an air management assembly for use in an engine.

BACKGROUND OF THE INVENTION

Due to both federal and state regulations, motorized vehicles today are limited to the amount of emissions in which they can release during operation. One way of reducing the amount of emissions released by the vehicle is to include an exhaust gas recirculation (EGR) valve in the vehicle's exhaust system. The EGR valve redirects at least a portion of the exhaust gas from the exhaust manifold of an engine, so that the exhaust gas is recirculated into the intake manifold of the engine along with fresh air. Control of the exhaust gas recirculation and fresh air intake air temperature, and boost in back pressure, can help reach the emissions requirements without giving up fuel consumption and dynamics.

However, the current EGR systems which are used to reach the emissions standards contain several components which can result in the assemblies being large. Currently, constructing the assemblies with separate components results in large assemblies, increases the amount of materials needed to construct the assembly, and increases the space which is required to place the assembly in the vehicle.

Therefore, it is desirable to develop an air management assembly in which multiple components are integrated into a single housing in order to reduce the space occupied by the assembly in the vehicle.

SUMMARY OF THE INVENTION

A first embodiment of the present invention relates to an air management assembly for use in an engine with an exhaust manifold that outputs an exhaust gas and an intake manifold, with a filter in fluid communication between the exhaust manifold and a turbocharger. The air management assembly provides a compressor, a turbine, at least one gaseous fluid cooler, at least one bypass, and a housing where the compressor, turbine, bypass, or combination thereof are integrated into the housing. The compressor is in fluid communication with the intake manifold. The turbine is in fluid communication with the exhaust manifold. The turbine and the compressor are moveably coupled and move in conjunction with one another. The gaseous fluid cooler is in fluid communication with the compressor, turbine, or combination thereof. The bypass is in fluid communication with an output of the turbine and an input of the compressor for selective bypassing of the gaseous fluid cooler.

A second embodiment of the present invention relates to an air management assembly for use in an engine with an exhaust manifold that outputs an exhaust gas and an intake manifold, with a filter in fluid communication between the exhaust manifold and a turbocharger. The air management assembly provides a compressor, a turbine, a charge air cooler, at least one exhaust gas recirculation (EGR) cooler, and a plurality of EGR valves. The housing is in fluid communication with the exhaust manifold and intake manifold. The compressor is in the housing and in fluid communication with the intake manifold. The turbine is in the housing and in fluid communication with the exhaust manifold. The turbine and the compressor are moveably coupled and move in conjunction with one another. The charge air cooler is in fluid communication with the compressor. The EGR cooler is in fluid communication with an output of the turbine and input of the compressor. A first EGR valve is in fluid communication with the charge air cooler. The second EGR valve is integrated with the housing of the turbine and is in fluid communication with the EGR cooler.

A third embodiment of the present invention relates to an air management assembly for use in an engine with an exhaust manifold that outputs an exhaust gas and an intake manifold, with a filter in fluid communication between the exhaust manifold and a turbocharger. The air management assembly provides a housing, a compressor, a turbine, at least one exhaust gas recirculation (EGR) cooler, a charge air cooler, a plurality of EGR valves, and at least one bypass. The housing is in fluid communication with the exhaust manifold and intake manifold. The compressor is in the housing and in fluid communication with the intake manifold. The turbine is in the housing and in fluid communication with the exhaust manifold. The turbine and the compressor are moveably coupled and move in conjunction with one another. At least one EGR cooler is in fluid communication with an output of the turbine and an input of the compressor. The charge air cooler is in fluid communication with the intake manifold. A first EGR valve is in fluid communication with the charge air cooler. The second EGR valve is in fluid communication with at least one of the EGR coolers. The bypass is in the housing and in fluid communication with an output of the turbine and an input of the compressor for selective bypassing of at least one of the EGR coolers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
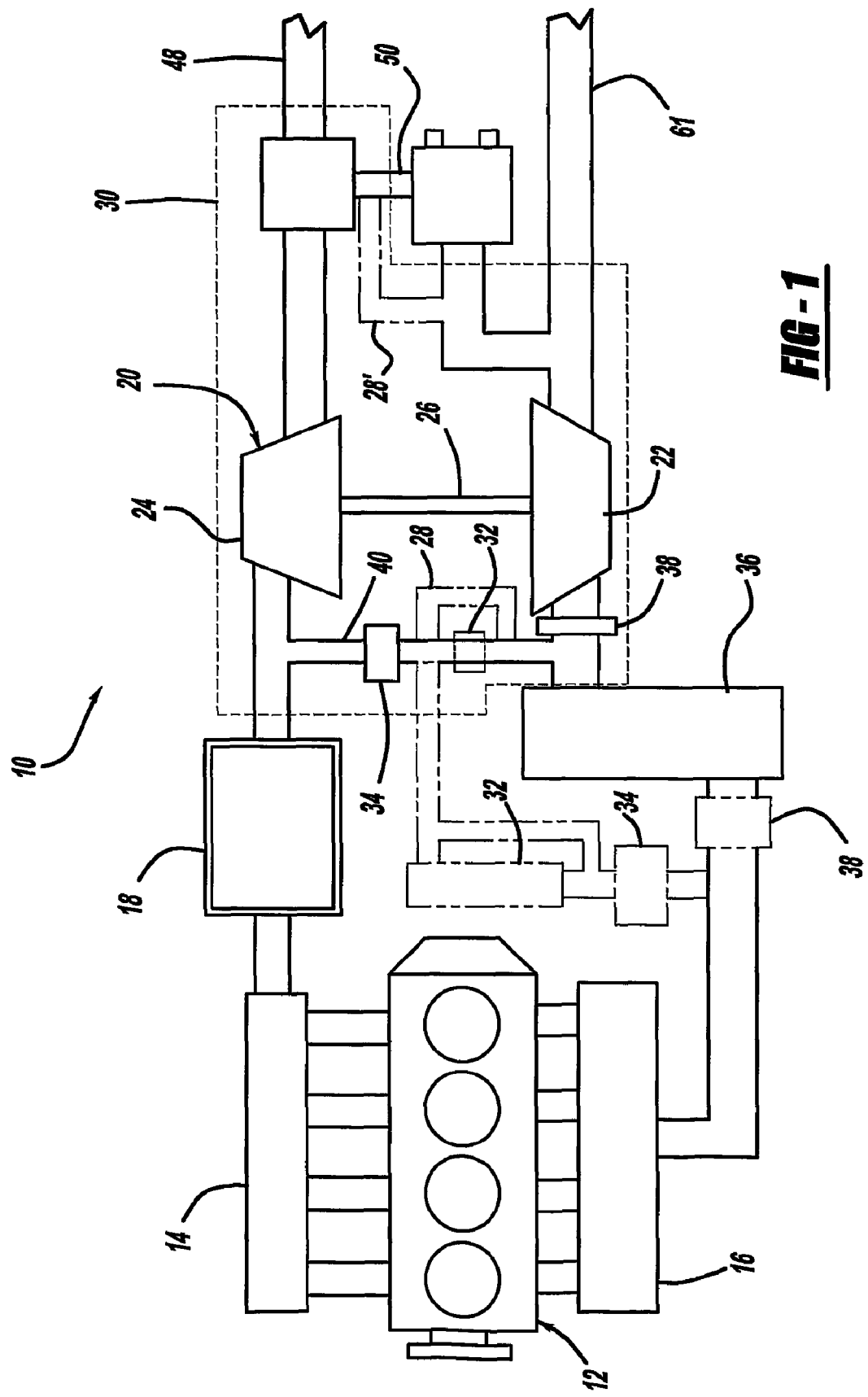
FIG. 1 is a schematic view of the air management assembly in accordance with the present invention.

In reference to FIGS. 1-3 and 5, an air management assembly is generally shown at 10. The air management assembly 10 is for use in an engine, generally indicated at 12, which has an exhaust manifold 14 and an intake manifold 16. A filter 18 is in fluid communication between the exhaust manifold 14 and a turbocharger generally indicated at 20. In a preferred embodiment the filter 18 is a diesel particulate filter.

The turbocharger 20 provides a compressor 22 that is in fluid communication with the intake manifold 16. The turbocharger 20 also provides a turbine 24 that is in fluid communication with the exhaust manifold 14. The turbine 24 and compressor 22 are moveably coupled by an axle 26, and move in conjunction with one another. Thus, as exhaust gas passes from the exhaust manifold 14 through the turbine 24, the turbine 24 rotates the axle 26 which causes the compressor 22 to rotate in conjunction with the turbine 24.

The air management assembly 10 also provides at least one bypass 28 that is in fluid communication with an output of the turbine 24 and an input of the compressor 22. The bypass 28 is used for selectively bypassing the exhaust gas around at least one of the other components of the air management assembly 10. The air management assembly 10 also provides a housing 30, where the compressor 22, the turbine 24, bypass 28, or any combination thereof are in the housing 30.

In a preferred embodiment, at least one EGR valve is integrated with the housing 30. A first EGR valve 34 directs the exhaust gas taken after the filter 18 to the intake manifold 16. Preferably, the first EGR valve 34 is a high pressure EGR valve. Thus, the first EGR valve 34 is in fluid communication with the intake manifold 16 and directs the exhaust gas to the turbine 24, the bypass 28, gaseous fluid cooler, such as but not limited to, a charge air cooler 36 or a first EGR cooler 32, or combination thereof. The charge air cooler 36 is in fluid communication with an output of the compressor 22 and the intake manifold 16. Since the filter 18 is in fluid communication between the exhaust manifold 14 and turbocharger 20, the first EGR valve 34 can direct exhaust gas directly to the charge air cooler 36 because the exhaust gas has already been cleaned of soot through the filter 18; thus, eliminating the need for the first EGR cooler 32. Further, this embodiment allows for a large, efficient charge air cooler 36 to be used since the first EGR cooler 32 is no longer present in the air management assembly 10. However, it is within the scope of the present invention that the first EGR cooler 32 (shown in phantom in FIGS. 1 and 3) remains in the air management assembly 10 and is in fluid communication with the first EGR valve 34 and intake manifold 16. Thus, the first EGR cooler 32 can be in fluid communication with the intake manifold 16 or the charge air cooler 36.

Figure 3:
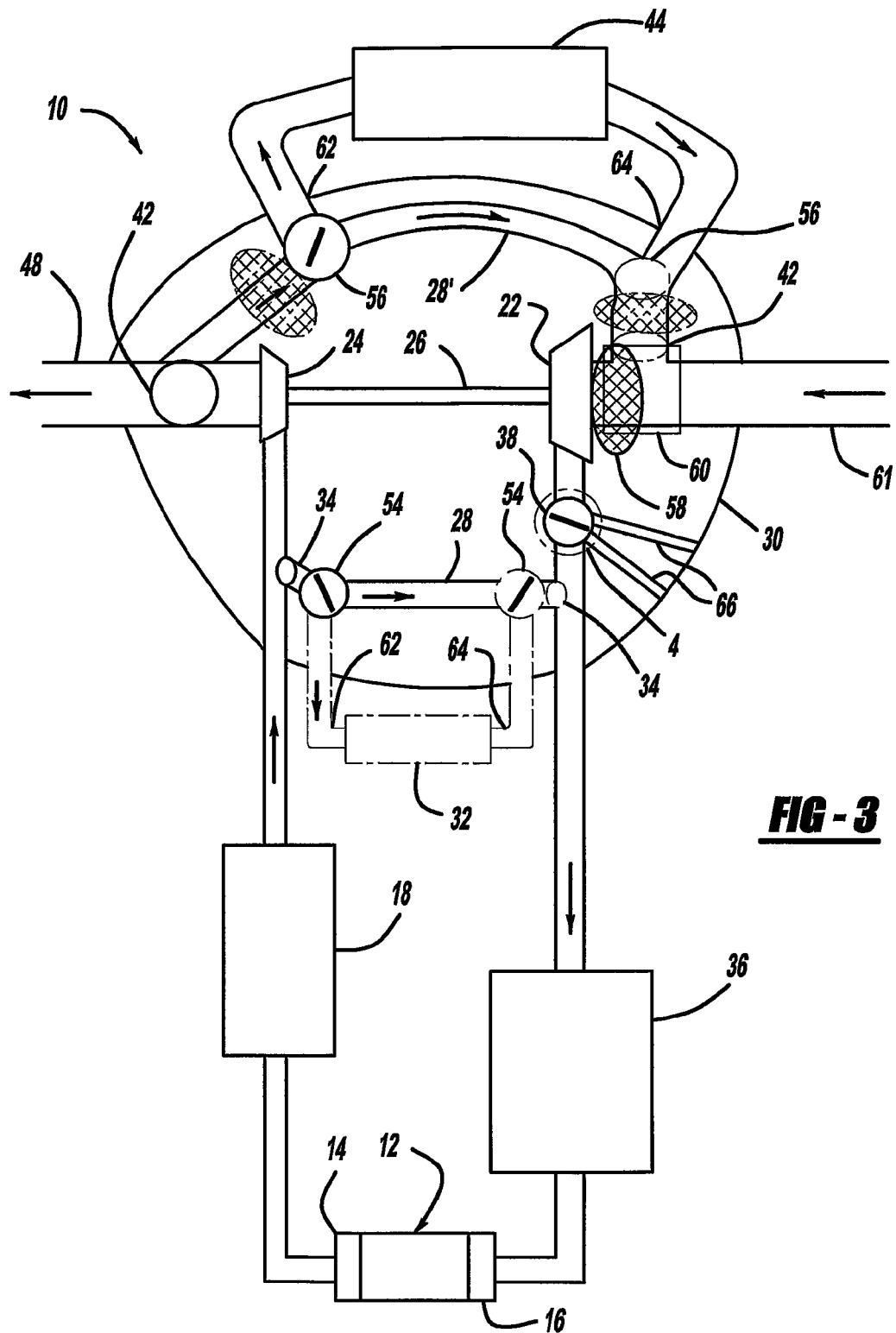
FIG. 3 is a schematic view of a housing with components integrated into and on the housing and additional components attached to the housing.

When the first EGR cooler 32 is being used in the air management system 10, the first EGR valve 34 can be placed in multiple locations with respect to the first EGR cooler 32 and bypass 28. For example, the first EGR valve 34 can be placed on a hot side or on the first EGR path 40 prior to or upstream of the first EGR cooler 32 and bypass 28, as shown in FIG. 3. Thus, it is referenced as the hot side because the exhaust gas has not passed through the first EGR cooler 32. Alternatively, the first EGR valve 34 can be placed on a cold side or on the first EGR path 40 after or downstream of the first EGR cooler 32 and bypass 28, as shown in phantom in FIG. 3. Thus, it is referenced as the cold side because the exhaust gas has passed through the first EGR cooler 32.

In an alternate embodiment, the first EGR valve 34 is integrated with the housing of the compressor 22. By integrating the first EGR valve 34 into the housing of the compressor 22, the space occupied by the first EGR valve 34 and compressor 22 is reduced when compared to when the first EGR valve 34 and compressor 22 are separate components.

Further, a throttle valve 38 is in fluid communication with the first EGR valve 34 in order to control the flow of exhaust gas through a first EGR path 40. Typically, the throttle valve 38 is downstream of the first EGR valve 34 on the first EGR path 40. However, the throttle valve 38 can be downstream from the first EGR valve 34, but adjacent to the output of the compressor 22 or adjacent the output of the charge air cooler 36 (shown in phantom in FIG. 1).

In a preferred embodiment, a second EGR valve 42 directs the exhaust gas to a second EGR cooler 44, a bypass 28', an exhaust 48, or any combination thereof. Preferably, the second EGR valve 42 is a low pressure EGR valve. The second EGR cooler 44 is in fluid communication with the output of the turbine 24 and the input of the compressor 22. Likewise, the bypass 28' is in fluid communication with the output of the turbine 24 and the input of the compressor 22 in order to selectively bypass the exhaust gas around the second EGR cooler 44. Thus, the exhaust gas can bypass the second EGR cooler 44 through the bypass 28' under desired circumstances, as described in greater detail below. The exhaust 48 is in fluid communication with the turbine 24 where the exhaust gas exits the air management assembly 10.

As described with respect to the first EGR valve 34, the second EGR valve 42 can be placed in multiple locations with respect to the second EGR cooler 44 and bypass 28'. For example, the second EGR valve 42 can be placed on a hot side or on the second EGR path 50 prior to or upstream of the second EGR cooler 44 and bypass 28', as shown in FIG. 3. Alternatively, the second EGR valve 42 can be placed on a cold side or on the second EGR path 50 after or downstream of the second EGR cooler 44 and bypass 28', as shown in phantom in FIG. 3.

Figure 2:
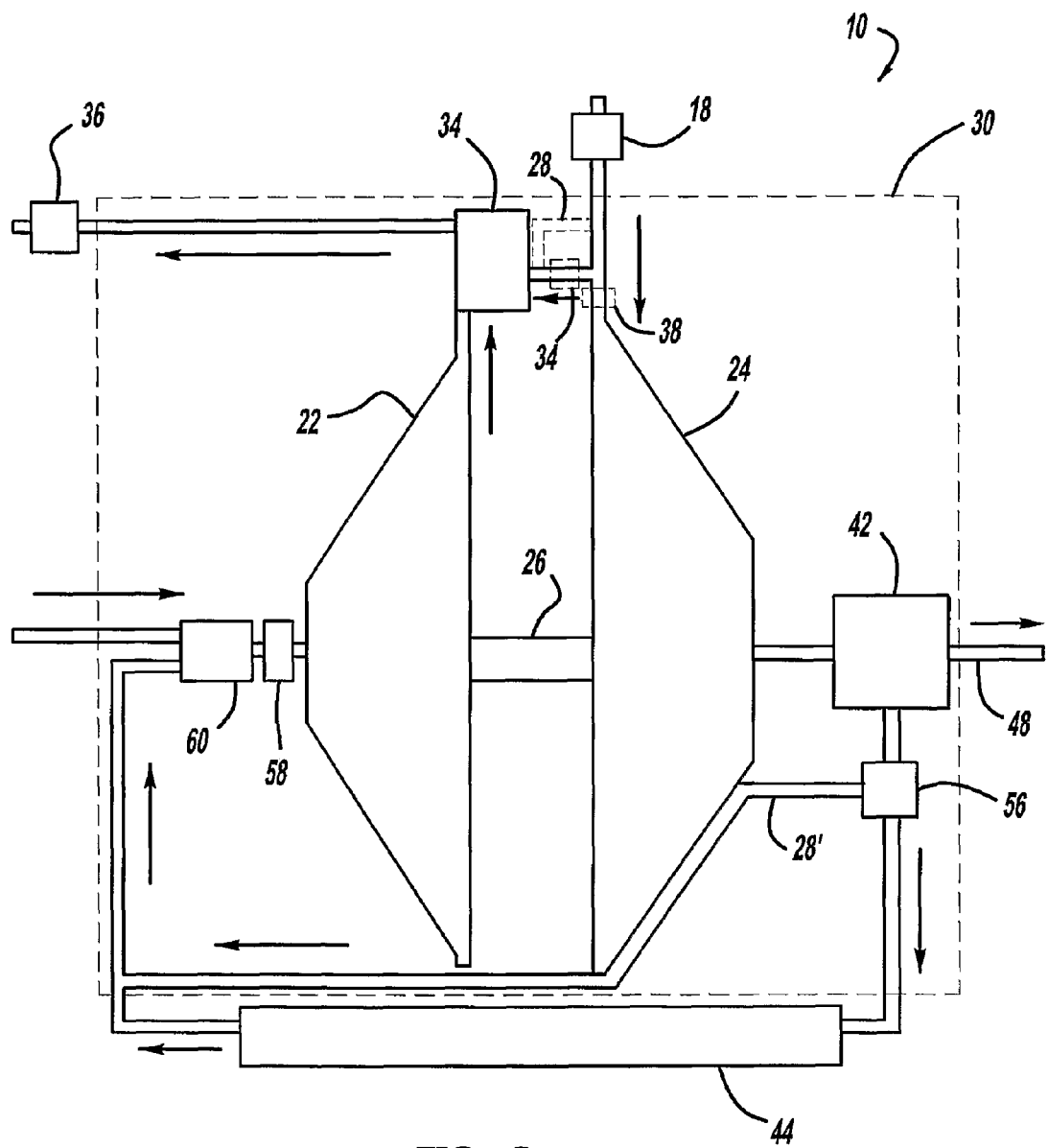
FIG. 2 is a schematic view of an embodiment of the housing in which components are integrated into the housing where a bypass is immediately adjacent a turbine.

In a preferred embodiment, the bypass 28' is immediately adjacent to the turbine 24, as shown in FIG. 2. By placing the bypass 28' immediately adjacent to the turbine 24, the exhaust gas passing through the bypass 28' is heated by the heat emitted from the turbine 24. The heat emitted from the turbine 24 is caused by the temperature of the exhaust gas passing through the turbine 24 having a high temperature. In a preferred embodiment, the bypass 28 is used to direct the exhaust gas from the output of the turbine to the input of the compressor without passing through a gaseous fluid cooler or the second EGR cooler 44. Thus, the combination of the bypass 28' being immediately adjacent to the turbine 24 and the second EGR cooler 44 creates a temperature control system to control the temperature of the gaseous fluid or exhaust gas entering the compressor 22.

For example, the temperature of the exhaust gas entering the compressor 22 can be increased by passing more exhaust gas through the bypass 28' than the second EGR cooler 44. Likewise, the temperature of the exhaust gas entering the compressor 22 can be decreased by passing more exhaust gas through the second EGR cooler 44 than the bypass 28'. Thus, the temperature control can be used to increase the temperature of exhaust gas at cold start or regulate the temperature of the exhaust gas to minimize condensation caused by high temperature exhaust gas in the air management system.

In an alternate embodiment, the second EGR valve 42 is integrated with the housing of the turbine 24. By integrating the second EGR valve 42 with the housing of the turbine 24, the space occupied by the second EGR valve 42 and turbine 24 is reduced, when compared to when the second EGR valve 42 and turbine 24 are separate components. Further, the second EGR valve 42 can be integrated with an exhaust gas throttle valve to form a single unit. The exhaust gas throttle valve controls the amount of air flow passing from the turbine 24 to the exhaust 48 or to a second EGR path 50. The integration of the second EGR valve 42 and exhaust gas throttle valve occupy less space than if the second EGR valve 42 and exhaust gas throttle valve were separate components. Examples of an EGR valve integrated with an exhaust gas throttle valve can be found in patent application PCT/US06/04345, filed on Feb. 7, 2006 having a common inventor, which is hereby incorporated by reference.

In a preferred embodiment, a first bypass valve 54 is located at the junction of the bypass 28 and first EGR cooler 32. The first bypass valve 54 controls the flow of exhaust gas through the bypass 28 and through the first EGR cooler 32 from the exhaust manifold 14. Similarly, a second bypass valve 56 is located at the junction of the bypass 28' and the second EGR cooler 44. The second bypass valve 56 controls the flow of exhaust gas from the output of the turbine 24 to the bypass 28' and the second EGR cooler 44. As described above, with the EGR valves 34, 42, the bypass valves 54, 56 can be placed on either the hot side or the cold side of the EGR cooler 32, 44, respectively.

It is preferred that at least one actuator 52 is operably connected to each EGR valve 34, 42 and each bypass valve 54, 56. Thus, separate actuators 52 alter the EGR valve 34, 42 in order to control the amount of exhaust gas flow through the first EGR path 40 and second EGR path 50. Similarly, separate actuators 52 are operably connected to the bypass valves 54, 56 in order to control the amount of exhaust gas flow through the first EGR cooler 32 and bypass 28, and the second EGR cooler 44 and bypass 28'. Preferably, the valves used for the first EGR valve 34, the throttle valve 38, the second EGR valve 42, and bypass valves 54, 56 are valves which are capable of being inserted into the housing 30 after the housing 30 has been formed. For example, the valves 38, 42, 54, 56 are pop-in butterfly valves.

In a preferred embodiment, all of the actuators 52 are controlled by a single controller 53; thus, the controller determines the position for the actuator 52 based upon vehicle conditions and sends a signal actuating the actuator 52. This is ideal due to the small size of the housing 30 and the integration of the components of the air management system 10. Thus, the amount of electrical wiring 55 to electrically connect the actuators 52 to the controller 53 is reduced when compared to an air management system 10 having a controller for all the actuators or a single controller for all of the actuators when the components are not integrated into a housing. Further, it is ideal to have a single controller 53 so that each actuator 52 does not require an individual controller.

Since the filter 18 is located between the exhaust manifold 14 and turbocharger 20, it is preferred that a second filter 58 be placed in fluid communication between the bypass 46, the second EGR cooler 44, and the input of the compressor 22. Thus, the second filter 58 can be placed at the junction of the output of the second EGR cooler 44 and bypass 46. However, the second filter 58 can be placed adjacent to the input of the compressor 22 (shown in phantom in FIG. 3), so that the exhaust gas from the bypass 46 and second EGR cooler 44 along with the mixed fresh air are passed through the second filter 58 in order to remove any debris which could damage the compressor 22.

In a preferred embodiment, a mixing unit 60 is in fluid communication with the turbine 24, the compressor 22, and an inlet 61 where fresh air enters the air management assembly 10. Typically, the mixing unit 60 is located after the second EGR cooler 44 and the bypass 46 and is adjacent the input of the compressor 22. Thus, the fresh air entering the air management assembly 10 is mixed with the exhaust gas in the mixing unit 60 prior to entering the compressor 22. In an alternate embodiment, the mixing unit 60 can be integrated into the housing of the compressor 22. When the mixing unit 60 is integrated with the housing of the compressor 22, the space occupied by the mixing unit 60 and compressor 22 is reduced when compared to when the mixing unit 60 and compressor 22 are separate components.

Preferably, the air management assembly 10 further provides a plurality of connection points on the exterior of the housing 30. Thus, an input of a gaseous fluid cooler, such as but not limited to, the EGR coolers 32, 34 connect to a first connection point 62 and an output of the gaseous fluid cooler connects to a second connection point 64. In a preferred embodiment, the connection of the gaseous fluid cooler to a first connection point 62 and second connection point 64 allows for the gaseous fluid cooler to be separate from the housing 30, but closely coupled to the housing 30, resulting in a consolidated air management assembly 10. However, it should be appreciated that the gaseous fluid cooler can be any predetermined distance from the housing 30 when connected to the housing 30 at the first connection point 62 and second connection point 64.

For example, the first EGR cooler 32 can be closely coupled to the housing 30 by an input of the first EGR cooler 32 being connected to the first connection point 62. Likewise, the output of the first EGR cooler 32 can be connected to the second connection point 64. Thus, the exhaust gas passes through the housing 30 and then exits the housing 30 and enters the first EGR cooler 32 and then reenters the housing 30. It should also be appreciated that the gaseous fluid cooler can be connected at only one connection point 62. For example, an input of the charge air cooler 36 can be connected to the housing 30 at the first connection point 32 and an output of the charge air cooler 36 is in fluid communication with the intake manifold 16.

Figure 4:
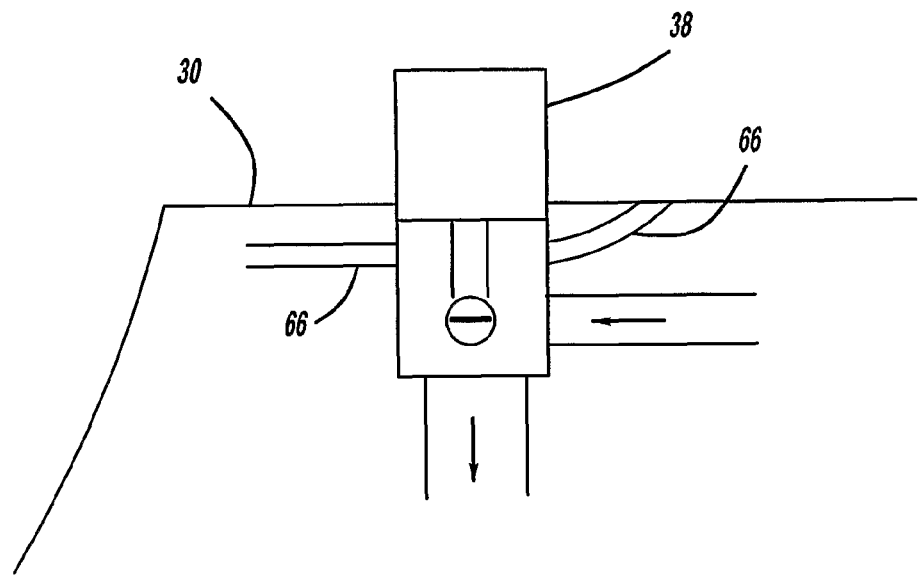
FIG. 4 is an enlarged schematic view of a throttle valve illustrating an integral cooling passage passing through a housing in accordance with the present invention taken along area 4 of FIG. 3.
Figure 5:
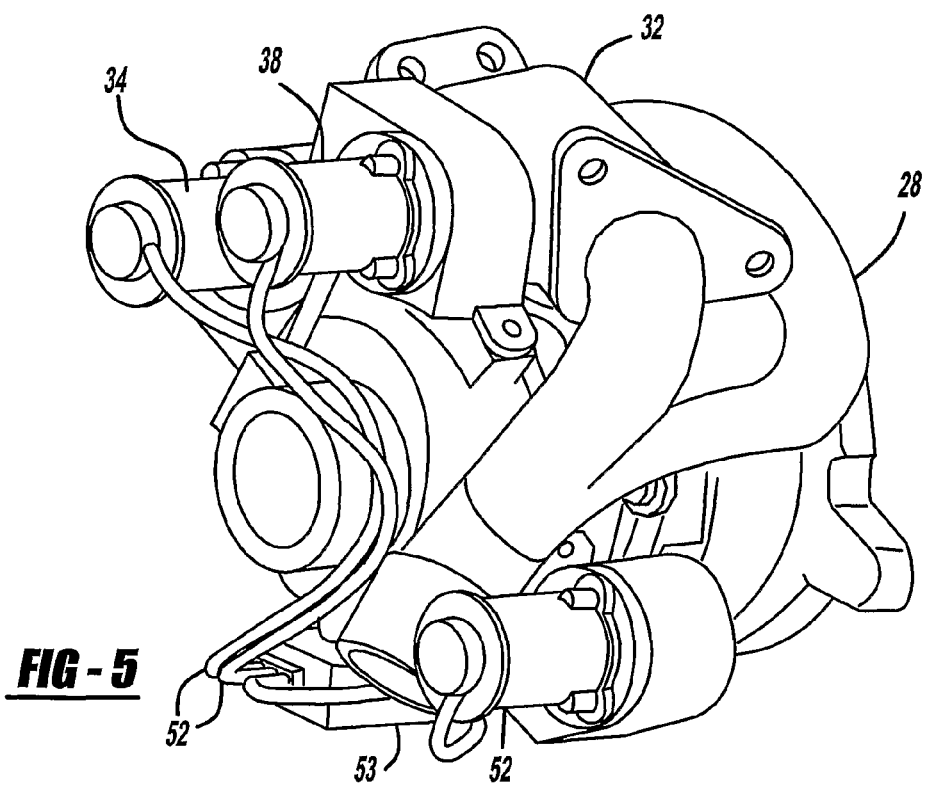
FIG. 5 is a perspective view of an embodiment of an air management system having components integrated to one another.

In reference to FIG. 4, in a preferred embodiment an integral cooling passage 66 is provided for cooling at least one component in the housing 30 where a cooling fluid passes through the integral cooling passage 66. Thus, the integral cooling passage 66 extends through the housing 30 past predetermined components in order to cool the component. For example, the integral cooling passage 66 can pass by the throttle valve 38 in order to cool the throttle valve 38. Typically, water is the cooling fluid and is passed through the integral cooling passage 66 in order to cool the components.

With continued reference to FIGS. 1-5, in operation, exhaust gas exits the engine 12 through the exhaust manifold 14 and passes through the filter 18, which is preferably in fluid communication between the exhaust manifold 14, the turbine 24, and the first EGR valve 34. Thus, the filter 18 is upstream from the turbine 24 and first EGR valve 34. A throttle valve 38 then controls the amount of exhaust gas that passes through the first EGR path 40 to the first EGR valve 34, and to the turbine 24. The exhaust gas that passes through the first EGR path 40 passes directly to the charge air cooler 36 in the preferred embodiment. In an alternate embodiment, the exhaust gas that passes through the first EGR valve 34 passes through a first EGR cooler 32 and then to the intake manifold 16 or into the charge air cooler 36. Further, the exhaust gas can pass through the bypass 38 around the first EGR cooler 32, and then to the intake manifold 16.

However, the exhaust gas that does not pass through the first EGR path 40, passes through the turbine 24. An exhaust gas throttle or combination of exhaust gas throttle and second EGR valve 42 controls the amount of exhaust gas flow through the second EGR path 50 or exhaust 48. The exhaust gas that passes through the exhaust 48 exits the air management assembly 10. The exhaust gas that passes through the second EGR path 50 then passes through the second EGR valve 42 into the second EGR cooler 44 or bypass 28'. Depending upon the conditions of the air management assembly 10, the exhaust gas can pass through the bypass 28' which is preferably immediately adjacent the turbine 24 to increase the temperature of the exhaust gas passing through the bypass 28'.

The exhaust gas then enters the mixing unit 60 where it is mixed with fresh air from the intake 61. The exhaust gas and fresh air mixture then passes through the second filter 58 and into the compressor 22. After that, the exhaust gas and fresh air mixture mixes with the exhaust gas from the first EGR path 40 and enters the charge air cooler 36 when the first EGR cooler 32 is not present in the air management assembly 10. However, when the first EGR cooler 32 is present the exhaust gas from the first EGR path 40 mixes with the exhaust gas and fresh air mixture downstream of the charge air cooler 36. After that, the exhaust gas and fresh air mixture enter the engine through the intake manifold 16.

By integrating the components in a housing 30, as described above, and placing the filter 18 outside of the housing 30, it is possible to form a compact housing 30 where components of the air management system 10 are integrated therein. Preferably, the housing 30 is formed by a casting process, and then the valves 34, 42, 54, and 56 are inserted into the housing 30. By constructing a compact housing 30 with the components integrated into the housing 30, the housing 30 occupies less space than if all the components integrated into the housing 30 in the present invention were separate components.

It is within the scope of the present invention that the components described above can be integrated into the housing in any predetermined combination. Thus, the compressor 22, turbine 24, first EGR valve 34, first EGR cooler 32, first bypass valve 54, second EGR valve 42, second EGR cooler 44, second bypass valve 56, first bypass 28, second bypass 28', throttle valve 38, second filter 58, or combination thereof, can be integrated into the housing 30. Similarly, it is within the scope of the present invention that the first EGR cooler 32, second EGR cooler 44, charge air cooler 36, or combination thereof can be attached to the housing.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. An air management assembly for use in an engine with an exhaust manifold that outputs an exhaust gas and an intake manifold, and a filter in fluid communication between said exhaust manifold and a turbocharger, said air management assembly comprising:
    a compressor in fluid communication with said intake manifold;
    a turbine in fluid communication with said exhaust manifold, wherein said turbine and said compressor are moveably coupled and move in conjunction with one another;
    at least one gaseous fluid cooler in fluid communication with at least one of said compressor and said turbine;
    at least one bypass in fluid communication with an output of said turbine and an input of said compressor for selective bypassing of said at least one gaseous fluid cooler;
    a housing, wherein said compressor, said turbine, and said bypass are in said housing;
    a first connection point on said housing, wherein an input of said gaseous fluid cooler connects to said housing; and
    a second connection point on said housing, wherein an output of said gaseous fluid cooler connects to said housing.

2. The air management assembly of claim 1, wherein said bypass is immediately adjacent said turbine, and said exhaust gas passing through said bypass is heated by the heat emitted from said turbine.

3. The air management assembly of claim 1 further comprising at least one exhaust gas recirculation (EGR) valve integrated with said housing, wherein a first EGR valve directs said exhaust gas taken after said filter into fluid communication with said intake manifold prior to said exhaust gas passing through said turbine.

4. The air management assembly of claim 3, wherein said first EGR valve directs said exhaust gas to at least one of said turbine, a charge air cooler in fluid communication with an output of said compressor and said intake manifold, and a first EGR cooler having a cold side in fluid communication with an input of said turbine and a hot side in fluid communication with said output of said compressor.

5. The air management assembly of claim 4, wherein said first EGR valve is in fluid communication with said first EGR cooler on at least one of said hot side and said cold side.

6. The air management assembly of claim 3, wherein said first EGR valve is integrated with a housing of said compressor.

7. The air management assembly of claim 3 further comprising a throttle valve in fluid communication with said first EGR valve.

8. The air management assembly of claim 3, wherein a second EGR valve directs said exhaust gas to at least one of a second EGR cooler having a cold side in fluid communication with said output of said turbine and a hot side in fluid communication with said input of said compressor, said bypass, and an exhaust where said exhaust gas exits said air management assembly.

9. The air management assembly of claim 8, wherein said second EGR valve is in fluid communication with said second EGR cooler on at least one of said hot side and said cold side.

10. The air management assembly of claim 8, wherein said second EGR valve is integrated with a housing of said turbine.

11. The air management assembly of claim 8, wherein said second EGR valve is integrated with an exhaust gas throttle valve to form a single unit.

12. The air management assembly of claim 8, wherein said first EGR valve is a high pressure EGR valve and said second EGR valve is a low pressure EGR valve.

13. The air management assembly of claim 3 further comprising at least one actuator operably connected to each EGR valve, wherein a controller operates each said at least one actuator.

14. The air management assembly of claim 1 further comprising a second bypass in said housing fluidly connected to an input of said turbine and an output of said compressor.

15. The air management assembly of claim 1 further comprising at least one bypass valve in said housing, wherein said bypass valve directs said exhaust gas into fluid communication with at least one of said gaseous fluid cooler and said bypass.

16. The air management assembly of claim 15 further comprising at least one actuator operably connected to said at least one bypass valve, wherein a controller operates each said at least one actuator.

17. The air management assembly of claim 1, wherein said filter is a diesel particulate filter.

18. The air management assembly of claim 1, wherein a second filter is in said housing and is in fluid communication with said input of said compressor.

19. The air management assembly of claim 1 further comprising a mixing unit in said housing in fluid communication with said turbine, and said compressor, and an intake, wherein said exhaust gas is mixed with air in said mixing unit.

20. The air management assembly of claim 19, wherein said mixing unit is integrated into a housing of said compressor.

21. The air management assembly of claim 1, wherein said housing further comprises an integral cooling passage for providing cooling to at least one component housed by said housing.

22. An air management assembly for use in an engine with an exhaust manifold that outputs an exhaust gas and an intake manifold, and a filter in fluid communication between said exhaust manifold and a turbocharger, said air management assembly comprising:
    a housing in fluid communication with said exhaust manifold and said intake manifold;
    a compressor in said housing in fluid communication with said intake manifold;
    a turbine in said housing in fluid communication with said exhaust manifold, wherein said turbine and said compressor are moveably coupled and move in conjunction with one another;
    a charge air cooler in fluid communication with said compressor;
    at least one exhaust gas recirculation (EGR) cooler in fluid communication with an output of said turbine and an input of said compressor;
    a plurality of EGR valves, wherein a first EGR valve is in fluid communication with said charge air cooler, and a second EGR valve is integrated with a housing of said turbine and in fluid communication with said at least one EGR cooler;
    a first connection point on said housing, wherein an input of said at least one EGR cooler connects to said housing; and
    a second connection point on said housing, wherein an output of said at least one EGR cooler connects to said housing.

23. The air management assembly of claim 22 further comprising at least one bypass in said housing, wherein a first bypass is immediately adjacent said turbine and is in fluid communication with said output of said turbine and said input of said compressor for selective bypassing of a first EGR cooler.

24. The air management assembly of claim 23, wherein a second bypass is in fluid communication with an input of said turbine and an output of said compressor for selective bypassing of a second EGR cooler.

25. The air management assembly of claim 22 further comprising a mixing unit in said housing in fluid communication with said turbine, said compressor, and an intake, wherein said exhaust gas is mixed with air in said mixing unit.

26. The air management assembly of claim 25, wherein said mixing unit is integrated into a housing of said compressor.

27. The air management assembly of claim 22 further comprising at least one bypass valve in said housing, wherein said bypass valve directs said exhaust gas into fluid communication with at least one of said charge air cooler, EGR cooler, and said bypass.

28. The air management assembly of claim 27 further comprising at least one actuator operably connected to at least one of said bypass valve and said EGR valve, wherein a controller operates each said at least one actuator.

29. The air management assembly of claim 22, wherein said first EGR valve is a high pressure EGR valve and said second EGR valve is a low pressure EGR valve.

30. An air management assembly for use in an engine with an exhaust manifold that outputs an exhaust gas and an intake manifold, and a filter in fluid communication between said exhaust manifold and a turbocharger, said air management assembly comprising:
    a housing in fluid communication with said exhaust manifold and said intake manifold;
    a compressor in said housing in fluid communication with said intake manifold;
    a turbine in said housing in fluid communication with said exhaust manifold, wherein said turbine and said compressor are moveably coupled and move in conjunction with one another;
    at least one exhaust gas recirculation (EGR) cooler in fluid communication with an output of said turbine and an input of said compressor;
    a charge air cooler in fluid communication with said intake manifold;
    a plurality of EGR valves, wherein a first EGR valve is in fluid communication with said charge air cooler, and a second EGR valve is in fluid communication with said at least one EGR cooler;
    at least one bypass in said housing in fluid communication to said output of said turbine and said input of said compressor for selective bypassing of said at least one EGR cooler;
    a first connection point on said housing, wherein an input of said at least one EGR cooler connects to said housing; and
    a second connection point on said housing, wherein an output of said at least one EGR cooler connects to said housing.

31. The air management assembly of claim 30, wherein said bypass is immediately adjacent said turbine so that said exhaust gas passing through said bypass is heated by the heat emitted from said turbine.

32. The air management assembly of claim 30, wherein a second EGR cooler is in fluid communication with an input of said turbine and an output of said compressor.

33. The air management assembly of claim 32, wherein a second bypass is in fluid communication with said input of said turbine and said output of said compressor for selective bypassing of said second EGR cooler.

34. The air management assembly of claim 30 further comprising a bypass valve in said housing, wherein said bypass valve directs said exhaust gas to fluid communication with at least one of said EGR cooler and said bypass.

35. The air management assembly of claim 34 further comprising at least one actuator operably connected to each said bypass valve and said EGR valve, wherein a controller operates each said at least one actuator.

36. The air management assembly of claim 30 further comprising a mixing unit in said housing in fluid communication with said turbine and said compressor, wherein said exhaust gas is mixed with air in said mixing unit.

37. The air management assembly of claim 36, wherein said mixing unit is integrated into a housing of said compressor.

* * * * *